United States Patent [19]

Arbenius

[11] Patent Number: 4,688,842
[45] Date of Patent: Aug. 25, 1987

[54] ARRANGEMENT IN AUTOMOTIVE VEHICLES

[76] Inventor: Göran Arbenius, Esplanaden 20, S-172 31 Sundbyberg, Sweden

[21] Appl. No.: 800,120
[22] PCT Filed: Mar. 5, 1985
[86] PCT No.: PCT/SE85/00099
   § 371 Date: Oct. 29, 1985
   § 102(e) Date: Oct. 29, 1985
[87] PCT Pub. No.: WO85/03912
   PCT Pub. Date: Sep. 12, 1985

[30] Foreign Application Priority Data
Mar. 5, 1984 [SE] Sweden ................ 8401209

[51] Int. Cl.$^4$ ............................................. B60R 5/04
[52] U.S. Cl. ................................ 296/24 R; 296/65 R
[58] Field of Search ............... 296/24 R, 63, 64, 69, 296/65 R

[56] References Cited

U.S. PATENT DOCUMENTS

| | | | |
|---|---|---|---|
| 3,015,515 | 1/1962 | Halstead et al. | 296/24 R |
| 3,547,217 | 12/1970 | Garza | 296/24 R |
| 3,806,183 | 4/1974 | Sieren et al. | 296/24 R |
| 3,891,263 | 6/1975 | Orsulak | 296/24 R |
| 4,015,875 | 4/1977 | Setina | 296/24 R |
| 4,035,014 | 7/1977 | Sellers | 296/24 R |
| 4,191,417 | 3/1980 | Ferrara | 296/69 |
| 4,509,788 | 4/1985 | Jan et al. | 296/24 R |

*Primary Examiner*—Robert B. Reeves
*Assistant Examiner*—Carol L. Olson
*Attorney, Agent, or Firm*—Kane, Dalsimer, Sullivan, Kurucz, Levy, Eisele & Richard

[57] ABSTRACT

An arrangement in an automotive vehicle for converting the vehicle from a first vehicle mode in which a protective barrier extends transversally between a forward vehicle compartment and a rearward vehicle compartment, and a second mode in which the vehicle has the form of a dormer-type vehicle providing at least one sleeping berth. The arrangement comprises an elongated transverse support beam which is attached to the floor of the vehicle at right angles to a longitudinal vehicle center line and which has first, second and third arrays of hinges arranged in given mutual relationship thereon. A first elongated sheet-like member is detachably connected to a first selected array of the hinges, for movement between a substantially vertical position in which it forms a barrier across the vehicle seat structure, and a horizontal position in which it forms part of a bed structure. A second sheet-like element is detachably connected to a second selected array of the hinges for movement between a vertical position in spaced relationship with the first sheet-like element in its raised position, and a horizontal position in which it forms a further part of the bed structure. A third sheet-like element is detachably connected to a selected third array of the hinges and arranged for movement between a vertical and horizontal position, in which latter position it forms a seat surface of the seat structure. The first, second and third arrays of hinges are arranged such as to enable a selected interchange to be made between the relative positions of selected first, second and third sheet-like elements, so as to enable dimensional changes to be made to the bed structure. Further elements are also provided for enabling changes to be made to the height dimensions of the first sheet-like element.

10 Claims, 14 Drawing Figures

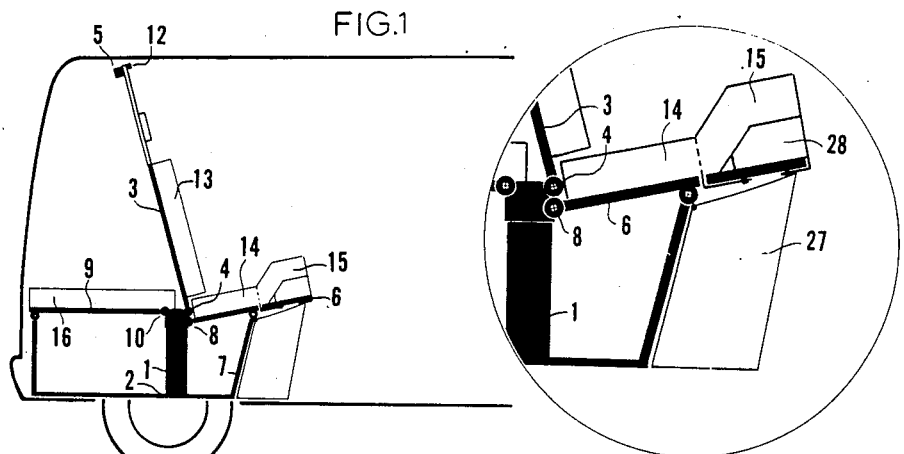
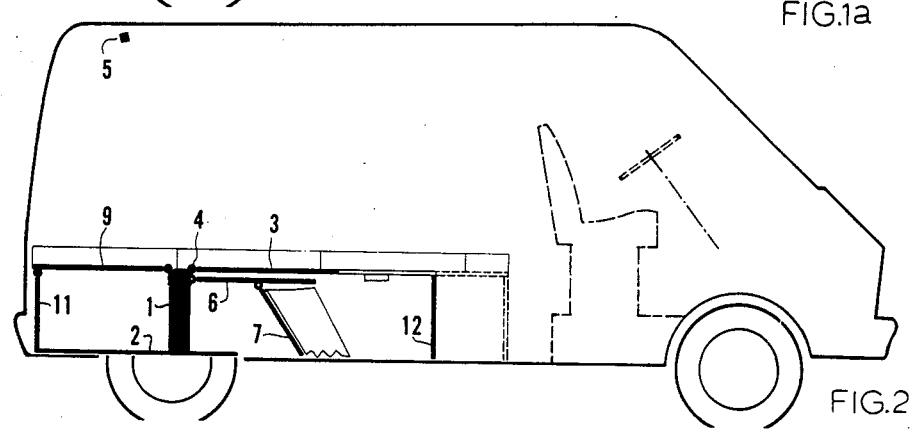
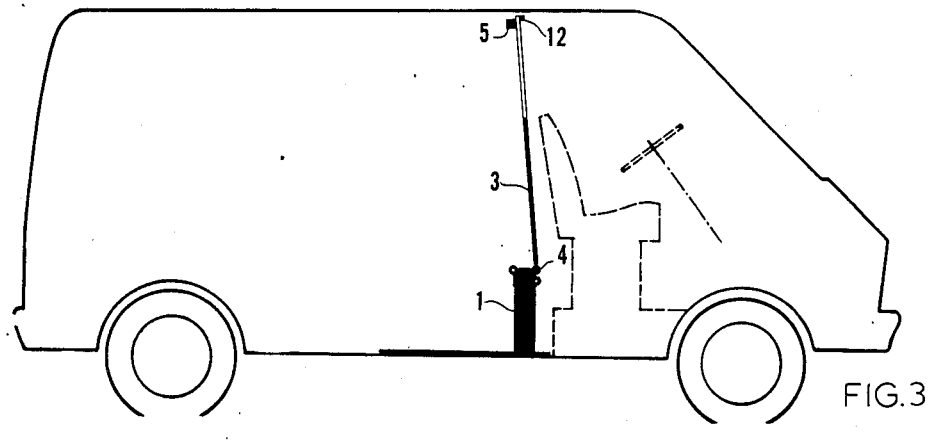

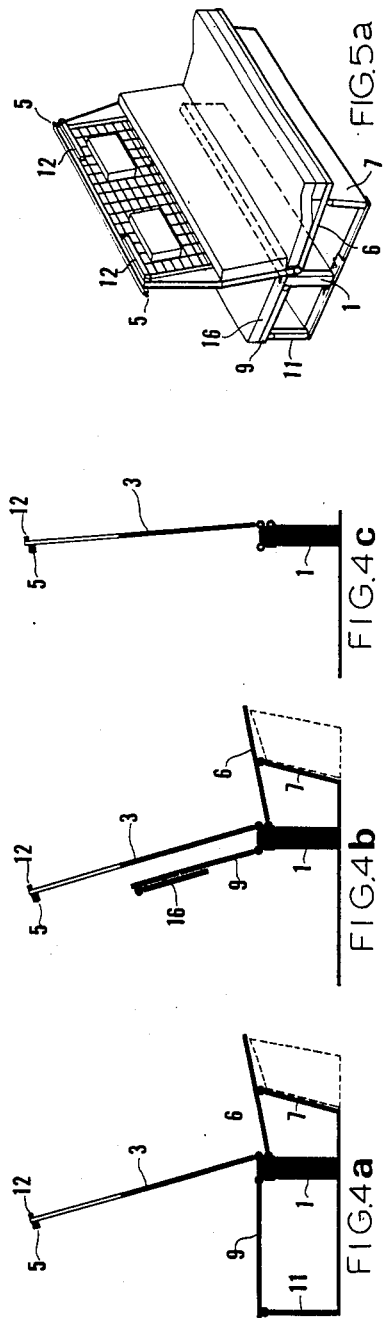

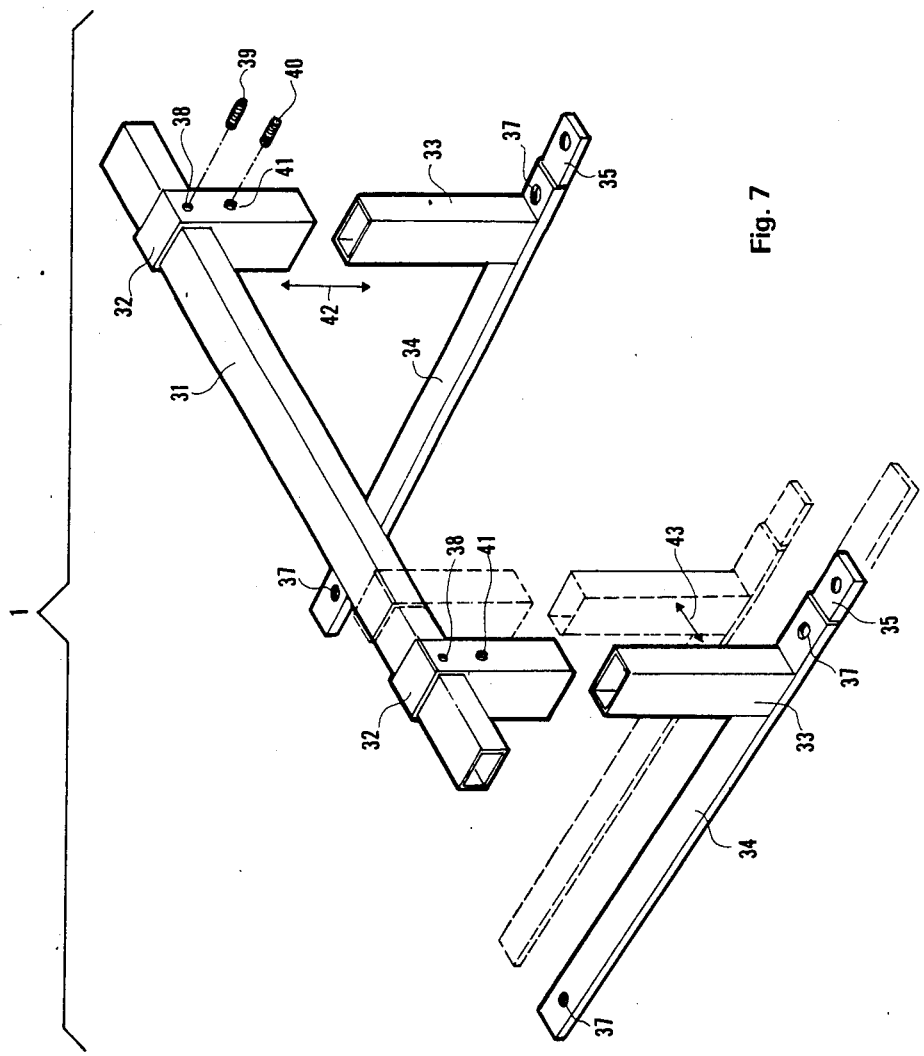

ARRANGEMENT IN AUTOMOTIVE VEHICLES

The present invention relates to an arrangement in automotive vehicles which is intended to prevent the displacement of a vehicle load in the direction of the longitudinal axis of the vehicle and to convert a vehicle seat into a horizontal bed surface.

With certain types of vehicle it is desirable to be able to arrange the vehicle furniture in a manner which enables the vehicle to be used as a transport vehicle, passenger vehicle and a so-called dormer vehicle, by which is meant a vehicle which also incorporates sleeping places. The object of the present invention is to provide an arrangement which enables these desiderata to be fulfilled. The arrangement is mainly characterized by a transverse support mounted in the flooring of the vehicle body and a sheet-like element which is pivotably mounted adjacent the support and which is intended to take firstly a substantially vertical position, in which the free end of the sheet-like element is attached, for example, to the roof of the vehicle and in which the said sheet-like element forms a shield against displacement of the load carried in the vehicle and also a back support and a neck support of a seat plate which is also pivotally mounted adjacent the transverse support, and secondly a substantially horizontal position in which support means are located between the free end of the sheet-like element and the vehicle floor, said sheet-like element forming one part of a bed, a further part of which has the form of an additional sheet-like element which is pivotally mounted adjacent the transfer support and which in its horizontal position is provided with support means located between the free end of the sheet-like element and the floor of the vehicle.

The invention will now be described in more detail with reference to the accompanying drawings, in which FIGS. 1 and 2 illustrate a part of an automotive vehicle in which the arrangement is mounted in the rearward part of said vehicle, FIG. 1 showing the arrangement adjusted to a position in which it forms a combined seat and protective shield against longitudinal displacement of a load, and FIG. 2 showing the arrangement adjusted to its bed-forming position.

FIG. 1a illustrates details of the seat of FIG. 1.

FIG. 3 illustrates the arrangement when mounted in the forward part of the vehicle rearwardly adjacent to the driving seat and operative as a load-displacement shield.

Figure 6:
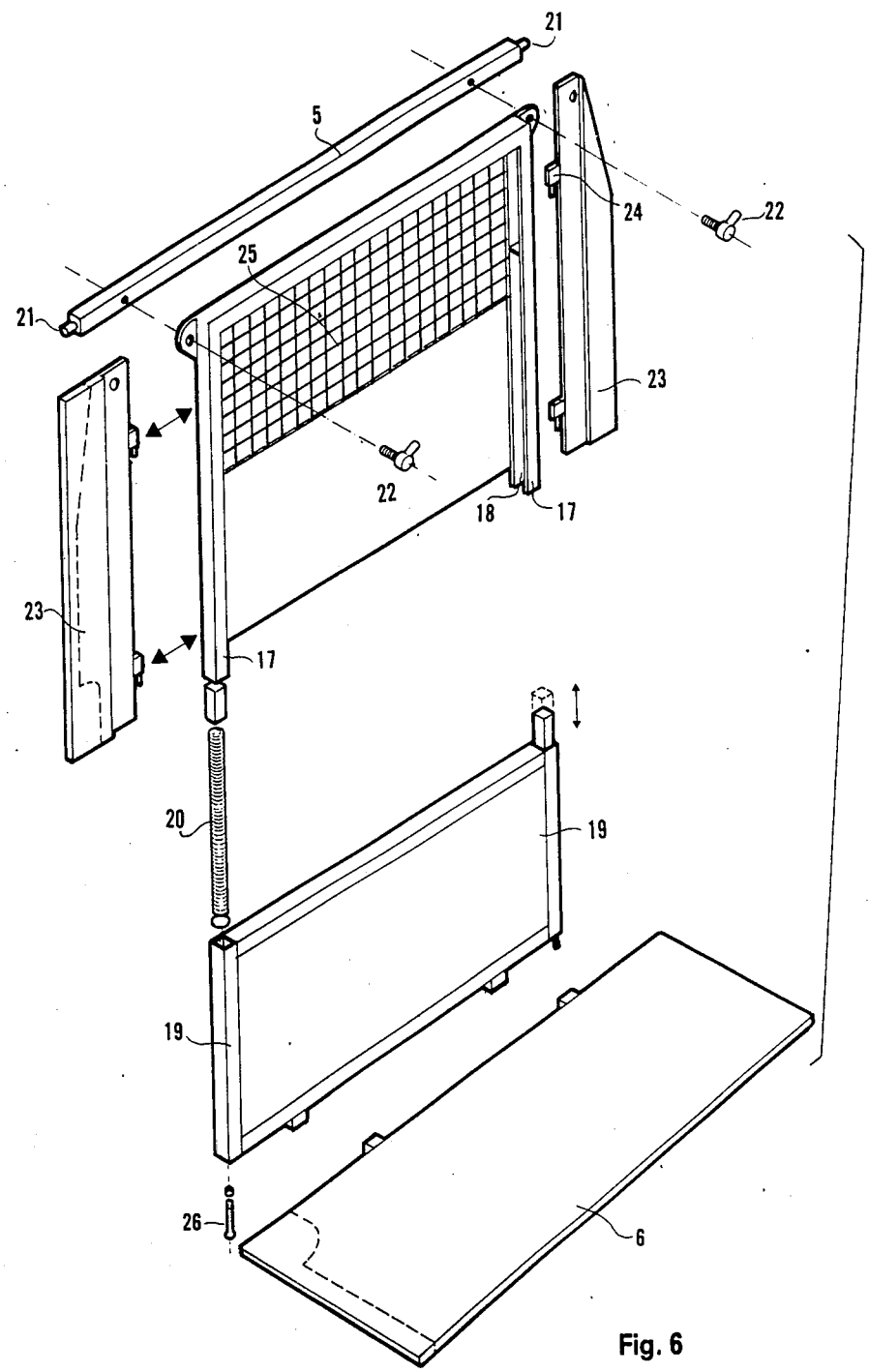

FIGS. 4a-f illustrate the various positions to which the arrangement can be adjusted, and FIGS. 5a and b illustrate the arrangement fitted with cushions and forming firstly a seat and secondly a bed.

FIG. 6 illustrates some of the structural components of the arrangement.

FIG. 7 illustrates an exemplary embodiment of the transverse support.

FIG. 1 illustrates the rearward part of an automotive vehicle, such as a delivery van for example. Mounted on the floor of the vehicle with the aid of attachment means 2 is a transverse support 1. When the vehicle is to function as a so-called dormer vehicle, the support may incorporate, for example, a tank for drinking water. Hinged to the support by means of hinges 4 is a sheet-like element 3 which can be moved to an upright position, as illustrated in FIG. 1, or a horizontal position, as illustrated in FIG. 2. When occupying its upright position, the free end of the sheet-like element is secured to a transverse support 5, for example a rod or bar mounted on the ceiling of the vehicle. The sheet-like element 3 is provided with collapsible supports 12, which can be extended outwardly so as to rest against the floor of the vehicle, in accordance with FIG. 2, when the element 3 is moved to its bed-forming position. When in its upstanding position, the sheet-like element 3 forms a backrest of a vehicle seat structure, this structure also incorporating a seat plate 6 which is pivotally mounted to the transverse support 1 on hinges 8. These hinges are located in a plane which is somewhat lower than the hinges of the sheet-like element 3. The seat plate 6 is provided with collapsible supports 7 so arranged that when the plate is moved to a position in which it forms part of the seat structure said plate will be inclined slightly in a rearward direction, as illustrated in more detail in FIG. 1a. When the sheet-like element 3 is swung to a horizontal position, the supports 7 are rotated in an opposite direction, so that the seat plate 6 lies fully beneath the sheet-like element 3. Also hinged to the transverse support 1 on hinges 10 is a pivotable auxiliary sheet-like member 9 provided with legs 11 which support the auxiliary sheet-like element 9 in a horizontal position, in which it forms part of the bed structure. FIG. 1a illustrates the sheet-like element 3 when provided with a cushion 13 and the seat plate 6 when provided with a cushion 14, the forwardly located part 15 of which incorporates a raised or folded part 28, to impart to the seat cushion a transverse promontory at the forward edge thereof, so as to impart a more comfortable seating structure to the cushion. When the arrangement is to be folded down to form a bed structure, the cushions 13 and 14 are removed and the sheet-like elemnt 3 dropped to its horizontal position, with the supports 12 swung down to the position illustrated in FIG. 2. The cushions are then replaced on the sheet-like element 3, as illustrated in FIG. 2, whereafter the bed is prepared. FIG. 1a also illustrates how the space beneath the seat plate 6 forwardly of the supports 7 can be used to house a storage bag 27.

FIG. 3 illustrates the manner in which the transverse support 1 is made firm to the vehicle floor immediately behind the driving seat. The illustrated sheet-like element 3 is in its upwardly swung position and attached to a rod-like member 5 provided on the ceiling of the vehicle. The supports 12 have been folded in against the element 3. In this position of the arrangement, the element 3 and the support 1 form a protective shield against axial movement of the load. Since in this instance the vehicle is to be used solely as a goods-carrying vehicle, the seat plate 6 and the auxiliary sheet-like element 9 have been removed.

The part FIGS. a-f of FIG. 4 illustrate the various positions to which the arrangement can be adjusted. FIG. 4a illustrates the same position as that shown in FIG. 1; FIG. 4b illustrates the position of the arrangement when the auxiliary sheet-like element 9 is lifted up against the element 3, to increase the available loading space; while FIG. 4c illustrates an adjusted position of the arrangement in which the seat plate 6 and the auxiliary element 9 are removed, as illustrated in FIG. 3. In FIG. 4d the sheet-like element 3 has taken the place of the auxiliary sheet-like element 9 and the seat plate 6 is located in the place formerly occupied by the sheet-like element 3, both sheet-like elements being shown in their respective outwardly swung positions. Similar to FIG. 2, FIG. 4e shows the sheet-like element 3 and the auxiliary sheet-like element 9 in their respective horizontal positions, these two sheet-like elements forming a bed in the vehicle. In the adjusted position of the arrangement shown in FIG. 4f, the seat plate 6 occupies a horizontal position and is located in the place of the element 3, which in turn has been moved to the place formerly occupied by the auxiliary sheet-like element 9. As illustrated in FIGS. 2, 4e and 4f, the sheet-like element 3 is arranged so that the bed can be given different lengths. The back support is also extendable, so as to enable it to be adapted to different vehicle ceiling heights.

FIG. 5a illustrates the sheet-like element 3 in its upwardly swung position, with the free end of said element attached to the rod 5. The element 3 is provided with cushions and neck pads. The seat plate 6 and the auxiliary sheet-like element 9 are located in their horizontal positions, and are also provided with cushions. FIG. 5d illustrates the arrangement adjusted to form a bed structure provided with cushions. The auxiliary sheet-like element 9 is located in an unchanged position. The sheet-like element 3 is located in a horizontal position, similar to FIG. 4e.

FIG. 6 illustrates an embodiment which enables the sheet-like element to be adjusted to different vehicle ceiling heights and to different bed lengths. In this embodiment, the sheet-like element comprises two parts. The first of these parts comprises a sheet 19 pivotally mounted to the transverse support 1. The other of said parts comprises a sheet 25 provided with a frame structure 17. The frame structure incorporates a profiled section 18 in which the vertical side edges of the sheet 19 can be displaced. The upper edge of the frame structure is intended to be screwed to the transverse support member 5 mounted on the ceiling of the vehicle body, with the aid of fastener means 22. Spring means 20 are provided in the vertical sections of the frame structure 17 and in the vertical side edges of the sheet 19 to facilitate lifting of the frame structure against the rod or bar 5. In this way, only a small force is needed to lift the sheet. As illustrated in the figure, the sheet 25 may be provided with a transparent portion, for example a net structure, to facilitate a rearward view. The space between the frame structure and the wall of the car body can be filled out with the aid of flanking boards 23 mounted to the vertical parts of the frame structure by means of fastener means 24.

FIG. 7 is an exemplary embodiment of the support 1. This support comprises two vertical supporting elements each comprising two mutually telescopic parts 32 and 33, the part 33 being firmly attached to a horizontal base member 34 provided with holes 37 for attachment of the base member to the floor of the vehicle. The base 34 incorporates a slidable part 35, which enables the base member to be lengthened. This part 35 is fully inserted into the base member 34 when the support element is placed immediately behind the driving seat, in accordance with FIGS. 3 and 4c. The vertical supports are mutually connected by a cross member 31 which is slidably arranged in the parts 32. This arrangement enables the support to be adjusted to different widths and heights in the vehicle body. It also affords the possibility of placing the support in desired positions in the vehicle body.

As beforementioned, FIG. 6 describes an embodiment of the arrangement. It will be understood, however, that various modifications can be made within the scope of the invention. The aforedescribed invention provides an arrangement which enables the vehicle to be converted quickly and in a simple fashion from, for example, a passenger vehicle to a dormer vehicle or goods-carrying vehicle, the arrangement functioning as a shield against axial movement of the load, a seat structure or a bed structure, depending upon the purpose for which the vehicle is used.

I claim:

1. An arrangement in an automotive vehicle for converting the vehicle from a first vehicle mode in which a protective barrier extends transversely between a forward vehicle compartment and a rearward vehicle compartment and a second mode in which the vehicle has the form of a dormer-type vehicle providing at least one sleeping berth, said arrangement comprising an elongated transverse support beam attached to the floor of the vehicle at right angles to a longitudinal vehicle center line; first, second and third arrays of hinge means arranged on the transverse support beam; a first elongated sheet-like member detachably connected to a first array of hinge means for movement between a substantially vertical position in which it forms a barrier transverse to the longitudinal vehicle center line and a horizontal position in which it forms part of a bed structure; a second sheet-like element detachably connected to the second array of hinge means for movement between a vertical position in spaced relationship with said first sheet-like element in its raised position and a horizontal position in which it forms a further part of said bed structure; and a third sheet-like element which is detachably connected to the third array of hinge means and arranged for movement between a vertical position and a horizontal position, in which latter position it forms a seat surface of said seat structure; said first, second and third arrays of hinge means being such as to enable a selected interchange to be made between the relative positions of selected first, second and third sheet-like elements to enable dimensional changes to be made to the bed structure.

2. An arrangement according to claim 1, wherein the first sheet-like element comprises an elongated frame structure and at least two sheet-like elements forming part elements arranged for relative movement towards and away from each other in a single plane, to change the dimension of the sheet-like element in said plane.

3. An arrangement according to claim 1, wherein the first sheet-like element comprises an elongated frame structure having side rails in which at least two sheet-like elements forming part elements are arranged for relative movement towards and away from one another in a single plane, to change the dimension of said sheet-like element in said plane.

4. An arrangement according to claim 1, wherein the first elongated sheet-like element is provided with means for attaching at least one long side thereof a flank board adapted to cover the space between said element and an adjacent vehicle side.

5. An arrangement according to claim 1, wherein elongated holdinge means is mounted on the ceiling of the vehicle and adapted to co-act with latching means on one end of the first sheet-like element to hold said element firmly in its raised position.

6. An arrangement according to claim 1, wherein the first sheet-like element comprises two upper and lower sheet-like part elements, each of which is embraced by a respective upper and lower frame structure, between two mutually opposite, at least partially hollow side members thereof, and spring means extending into a pair of mutually facing hollows on resepctive side members, to cause said upper and lower frame structures to move away from one another.

7. An arrangement according to claim 6, wherein the upper frame structure is secured to an elongated holding member anchored to the ceiling of the vehicle.

8. An arrangement according to claim 1, wherein the first sheet-like element has hinged thereto leg means which fold against said element in the raised position thereof.

9. An arrangement according to claim 1, wherein the seat-surface forming third sheet-like element accommodates means for raising the extremity of said element from the horizontal plane.

10. An arrangement according to claim 1 for adjusting the transverse support to different height, width and length spaces in the vehicle body, wherein the transverse support includes members which can be displaced in the lateral direction of the vehicle and which are mounted in two vertical support means capable of being displaced vertically in said vehicle and mounted in two mounting means attached to the floor of the vehicle and capable of being displaced in the longitudinal direction thereof.

* * * * *

UNITED STATES PATENT AND TRADEMARK OFFICE
CERTIFICATE OF CORRECTION

PATENT NO. : 4,688,842

DATED : August 24, 1987

INVENTOR(S) : GÖRAN ARBENIUS

It is certified that error appears in the above-identified patent and that said Letters Patent is hereby corrected as shown below:

Column 2, line 53, "The part FIGS. a-f of Fig. 4" should read -- FIGS. 4a to 4f --.

Column 3, line 17, "5d" should read -- 5b --.

Column 3, line 27, "the transverse support 1" should read -- a transverse support 1 as shown in other drawings, such as FIGS. 1 to 5b --.

Column 3, line 34, "22" should read -- 22, the rod or bar 5 having endpieces 21 --.

Column 3, line 38, "5" should read -- 5, a connection means 26 such as a screw or rivet contacting one end of spring means 20 --.

UNITED STATES PATENT AND TRADEMARK OFFICE
CERTIFICATE OF CORRECTION

PATENT NO. : 4,688,842

DATED : August 25, 1987

INVENTOR(S) : GÖRAN ARBENIUS

It is certified that error appears in the above-identified patent and that said Letters Patent is hereby corrected as shown below:

Column 4, Claim 5, line 2 thereof, "holdinge" should read -- holding --.

Column 4, Claim 6, line 7 thereof, "resepctive" should read -- respective --.

Signed and Sealed this

Twenty-sixth Day of January, 1988

Attest:

DONALD J. QUIGG

Attesting Officer

Commissioner of Patents and Trademarks